United States Patent
Chene et al.

(10) Patent No.: US 10,570,317 B2
(45) Date of Patent: Feb. 25, 2020

(54) POWDERED ADHESIVES

(71) Applicant: Zephyros, Inc., Romeo, MI (US)

(72) Inventors: Morgan Chene, Altorf Molsheim (FR); Christophe Henry, Altorf Molsheim (FR)

(73) Assignee: ZEPHYROS, INC., Romeo, MI (US)

( * ) Notice: Subject to any disclaimer, the term of this patent is extended or adjusted under 35 U.S.C. 154(b) by 543 days.

(21) Appl. No.: 15/126,448

(22) PCT Filed: Mar. 30, 2015

(86) PCT No.: PCT/IB2015/052340
§ 371 (c)(1),
(2) Date: Sep. 15, 2016

(87) PCT Pub. No.: WO2015/145408
PCT Pub. Date: Oct. 1, 2015

(65) Prior Publication Data
US 2017/0081555 A1  Mar. 23, 2017

(30) Foreign Application Priority Data

Mar. 28, 2014  (GB) .................... 1405637.8

(51) Int. Cl.
| | | |
|---|---|---|
| C09J 5/06 | (2006.01) | |
| C09J 5/08 | (2006.01) | |
| C09J 9/00 | (2006.01) | |
| C09J 163/00 | (2006.01) | |
| B05D 1/06 | (2006.01) | |

(52) U.S. Cl.
CPC ............. *C09J 5/06* (2013.01); *B05D 1/06* (2013.01); *C09J 5/08* (2013.01); *C09J 9/00* (2013.01); *C09J 163/00* (2013.01)

(58) Field of Classification Search
CPC ......... C09J 5/06; C09J 5/08; C09J 9/00; C09J 163/00; B05D 1/06; C08L 51/04; C08L 63/00
USPC .......................................................... 523/400
See application file for complete search history.

(56) References Cited

U.S. PATENT DOCUMENTS

| | | |
|---|---|---|
| 2004/0221953 A1 | 11/2004 | Czaplicki |
| 2014/0027039 A1 | 1/2014 | Czaplicki |

FOREIGN PATENT DOCUMENTS

| | | |
|---|---|---|
| CN | 1798820 A | 7/2006 |
| CN | 102947403 A | 2/2013 |
| DE | 3938376 A1 | 5/1991 |

(Continued)

OTHER PUBLICATIONS

PCT International Search Report dated Jul. 6, 2015; Application No. PCT/IB2015/052340.

(Continued)

*Primary Examiner* — David T Karst
(74) *Attorney, Agent, or Firm* — The Dobrusin Law Firm, P.C.; Bryan S. Lemanski

(57) ABSTRACT

An adhesive comprising a solvent free powder of average particle size in the range 20 to 300 preferably 20 to 150 microns is heat activated at a temperature in the range 140° C. to 220° C., is flowable at a temperature below the heat activation temperature and is dry and non-tacky to the touch at ambient temperature, the use of a powdered adhesive is particularly useful for bonding of non-planar surfaces with complex contours.

20 Claims, 1 Drawing Sheet

(56) References Cited

FOREIGN PATENT DOCUMENTS

| EP | 0557657 | A1 | | 9/1993 | |
|---|---|---|---|---|---|
| WO | WO-2011141148 | A2 | * | 11/2011 | ......... C08G 59/4021 |
| WO | 2013/068819 | A2 | | 5/2013 | |

OTHER PUBLICATIONS

PCT International Preliminary Report on Patentability dated Jun. 6, 2016; Application No. PCT/IB2015/052340.
Chinese First Office Action dated Dec. 4, 2018, Application No. 201580017326.8.
Chinese Second Office Action dated Jun. 13, 2019, Application No. 201580017326.8.

* cited by examiner

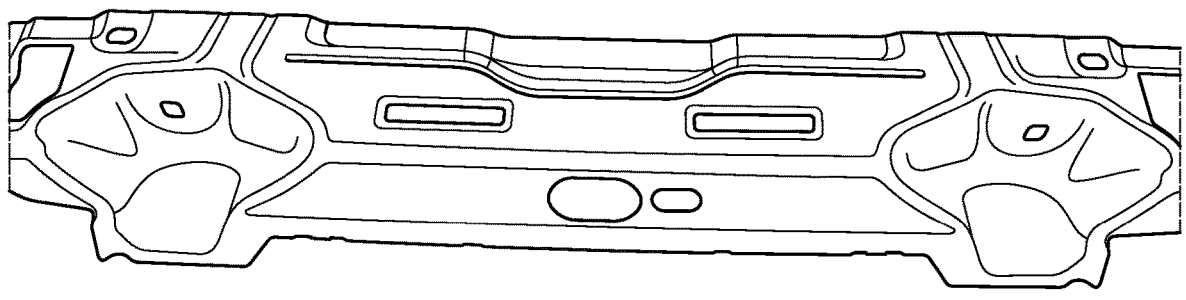
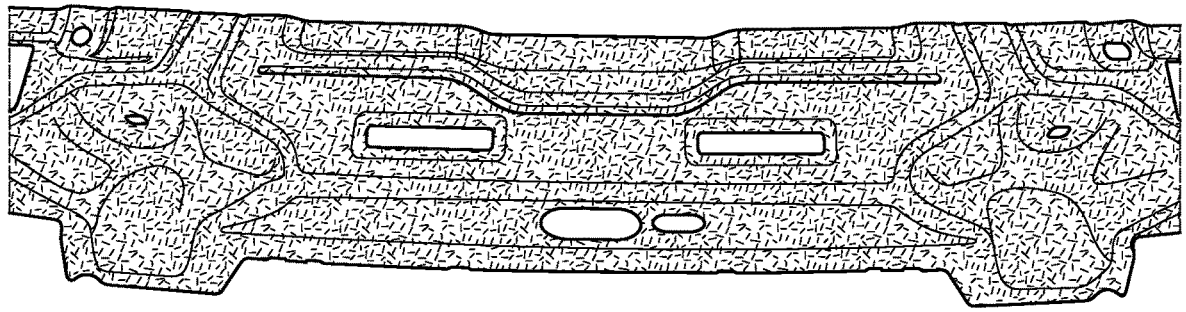

POWDERED ADHESIVES

FIELD

The present invention relates to heat activated adhesives and in particular to powdered heat activatable adhesives, their production and the application of the powdered adhesives to a substrate by spraying. The invention is particularly useful with adhesives to be used to adhere complex non-planar shapes where application of the adhesive by extrusion or as a tape is difficult to produce a uniform layer of the adhesive due to the complex non-planar surface.

BACKGROUND

Spraying of thermosetable materials such as by electrostatic deposition provides a powder coating process producing accurate and consistent layer thickness. Deposition by spraying is common with a variety of curable materials including inks, epoxies, polyesters, ceramics and other materials that are cured shortly after deposition. However, deposition of adhesive materials that are to be subsequently heated to coalesce without activation after deposition and then to be activated by heat has faced a number of challenges, specifically related to issues of creating a suitable free flowing powder form of the adhesive without particle agglomeration and without premature unwanted activation of the adhesive. Additionally it is desirable that the adhesive once deposited on a substrate is dry and non-tacky to the touch and furthermore it is preferable that the adhesive is solvent free to avoid the formation of volatile organic compounds. It is also important that the adhesive has a cure cycle whereby cure can be accomplished at a later activation stage perhaps at a different location. Additionally adhesive powders may have a tendency to form agglomerates and to create sticky substrates, both of which reduce the effectiveness and usability of the adhesive layer.

In United States Patent Application Publication 2014/0027039 we describe a method for forming an adhesively bonded article, comprising the steps of providing at least one first substrate having at least one first surface, and electrostatically delivering particles for forming a precursor layer to the at least one first surface. The particles may include precursors for defining a latent curing polymeric material that exhibits adhesive characteristics upon curing, wherein the particles of the precursor layer have an average size in the range of about 20 to about 150, preferably 50 to 100 microns. The particles may be of a solid precursor formulation that is substantially free of any solvent. The particles of the sprayed layer may then be physically transformed to form a substantially non-oriented fused precursor layer film that is tack-free and dry to the touch while on the at least one first surface and substantially entirely throughout the period to which it remains unexposed to a reaction activation condition. The precursor layer film may have a generally uniform thickness of less than about 0.3 mm. The precursor layer film may be subjected to a reaction activation condition to cause cross-linking and to define a cross-linked reaction product material that adhesively bonds the at least one first substrate with the at least one second substrate.

According to US 2014/0027039 one or both of the first substrate or the second substrate may be a metallic material. Alternatively one of both of the first substrate or the second substrate may be a polymeric or composite material.

SUMMARY

The application of powdered adhesives by spraying is particularly useful where the substrate is of a complex shape and it is not easy to provide a uniform covering of the adhesive by the use of conventional adhesive films or coating with a solution of the adhesive or by extrusion. However, there remains a problem of agglomeration of the powdered adhesive particles. We have found that although the process of US 2014/0027039 provides benefits and can be used for the delivery of heat activatable adhesives there remain these problems leading to uneven distribution of the adhesive particles over the surfaces which in turn can lead to the formation of adhesive bonds of non-uniform strength between the substrates. One particular use of the adhesives is on automobile components where the adhesive is activated by the heat in the baking oven for the anticorrosion coat (e-coat) that is applied to the metal body of the automobile during assembly. In this embodiment it is important that the components provided with the adhesive are stackable and can be transported without activation of the adhesive and that they are not subject to any conditions prior to or during deposition of the adhesive or storage and transportation that impacts the ability of the adhesive to cure under the conditions in the baking oven. It is also important that the powdered adhesive retain the desired mechanical properties of the bond created by the adhesive as compared with similar adhesives applied by coating such as extrusion or as a tape.

It is important that when powders are applied to surfaces they will adhere to the surface upon which they are being applied. Various technologies may be used to ensure the required adhesion. The surface may be treated to improve adhesion and/or it may be maintained at a temperature at which the adhesive particles will adhere to the surface. The present invention is particularly concerned with the application of powdered adhesives to substrates in which the powdered adhesive adheres to the substrate but does not develop its ultimate adhesive properties so that the substrate coated with the adhesive can be bonded to a second substrate by subsequent heat activation of the adhesive. The coated substrate may be transported to another location before the adhesive is activated. Any initial modification of the surface of the substrate to secure the adhesive should not therefore result in the activation of the adhesive. Additionally it is preferred that the adhesive once applied to the substrate will provide a layer on the substrate which is dry and non tacky to the touch at ambient temperature so that the adhesive coated substrate will not adhere to dirt and dust and can be readily transported.

BRIEF DESCRIPTION OF THE DRAWINGS

FIG. 1 illustrates a perspective view of an exemplary automobile component that may include an adhesive disposed thereon.

DETAILED DESCRIPTION

The adhesive of the present invention is therefore a solvent free powder of average particle size in the range 20 to 300 preferably 20 to 150 micros is heat activated at a temperature in the range 140° C. to 220° C., is flowable at a temperature below the heat activation temperature and is dry and non-tacky to the touch at ambient temperature.

Additionally, we have found that these requirements can be satisfied if the adhesive powder is prepared at temperatures below −10° C.

Accordingly, in a further embodiment the invention provides a process for the production of a heat activatable polymeric adhesive powder containing a heat activated curing agent of average particle size from 20 to 100 microns comprising comminuting the heat activated adhesive formulation to an average particle size of from 20 to 150 microns in an environment that is at a temperature below −10° C.

The powders of this invention preferably have a particle size in the range of 20 to 300 microns preferably 20 to 150 microns. The powders are preferably prepared by comminuting preferably by grinding pellets of the appropriate formulation under a cold inert atmosphere such as a stream of liquid nitrogen. Once prepared the powders are preferably stored and transported in a sealed container. In a preferred embodiment the powders are prepared at a temperature no higher than −20° C.

The particle size is measured using a laser particle size meter.

It is preferred to produce the powdered adhesive from pellets of the adhesive formulations by pulverising the pellets to a size that will pass through a suitable sized mesh. In the preferred embodiment the pellets, the grinding apparatus and the powder are held under a blanket of liquid nitrogen during the production of the powder. The pulverisation may be achieved electrostatically.

In a preferred embodiment the adhesive formulation contains an anticaking agent such as silica or finely divided calcium stearate from 0.1 to 4 wt % of a caking agent is particularly useful.

In a further preferred embodiment the adhesive is foamable and contains a blowing agent which is activated to liberate gases for causing foaming at the temperatures at which the final cure takes place so that the curing of the polymer encapsulates the gases liberated by the blowing agent to cause the formulation to foam.

The powdered adhesive of this invention may be maintained in a dry solid state. The formulation preferably remains in a powdered form during one or more of formation, storage, and deposition upon the substrate. Deposition is performed by spraying preferably electrostatically which may be performed in the absence of any contact between the first substrate and any dispenser through which the powdered formulation is delivered.

After application of the powder to the substrate it may be converted to a continuous layer perhaps by heating although it should not be heated to the adhesive activation temperature typically the activation temperature of the curing agent or the activation temperature of any blowing agent that may be included. The step of physically transforming the particles to a continuous layer may include heating the particles to a temperature at which the precursor composition softens and flows as a thermoplastic material, but below which it will cross-link for forming a thermoset material, for example they may be heated to a temperature at least 60-80° C. below the temperature for the step of activating the adhesive. The latent curing polymeric material may include an ethylene copolymer or terpolymer; phenoxy resin, phenolic resin, epoxy, an acrylate, a blocked thermoplastic polyurethane, or any combination thereof. Epoxy resins being preferred. The next step of subjecting the precursor layer film to an activation condition may include heating the film to a temperature above a cross-linking activation temperature for cross-linking the adhesive.

The powdered adhesive formulation may be delivered in several stages so that the thickness of the precursor layer film is increased. The delivery may be repeated in one or more specific areas of the first substrate so that the thickness of the precursor layer film is increased in the one or more specific areas. Alternatively, a second composition can be applied to the first composition. This could be of interest for example to tailor the adhesive for maximum performance should two different substrates be bonded. Additionally the adhesive can be applied to any selected areas of the substrate either by selective delivery of the powdered adhesive or by providing masks over certain areas of the substrate. The powdered adhesive formulation is preferably storage stable for at least six months, more preferably at least one year.

In this invention a powdered adhesive material is deposited onto a substrate to form a layer of activatable adhesive. The powder particles may then be transformed to form a substantially non-oriented fused layer film which may subsequently be subjected to a condition to activate the curing agent in the formulation to cause cross-linking to bond together two or more substrates. The powder may also be applied to a substrate by dip coating of the substrate into a bath of the powder. In this instance the substrate may be heated to improve adhesive of the powder to the substrate.

In general, the invention provides an adhesive composition that remains in powdered form with reduced particle agglomeration during storage and deposition and has a reduced tendency for blocking of the particles as they flow during deposition and which subsequently undergoes a first transformation into a fused layer and then a second transformation into a cured adhesive. The adhesive composition is in powdered form in its uncured state, it can be deposited onto a substrate particularly a substrate of complex non-planar configuration without activation of its adhesive properties to form a layer of powder particles, which are transformed to form a film layer perhaps by melting together at a temperature below the adhesive activation temperature and optionally with control of the melt viscosity by means of a low temperature curing agent to prevent sagging of the molten material and subsequently subjected to activation conditions to develop adhesive properties typically by cross-linking due to the activated high temperature curing agent. The use of the powdered material enables uniform bonds to be produced with substrates of complex structure which a uniformity that is difficult to achieve with coated or extruded adhesives or with tapes. We have also found that the strength of the bond is comparable to that achieved with coated or extruded adhesives or tape on flat substrates.

During deposition, the adhesive powder is deposited and then fused onto a substrate surface to form a layer of the activatable adhesive, which is a preferably a substantially solid layer. To sufficiently initially adhere to the substrate on deposition and fuse to form the film, the powdered adhesives are formed of particulates in an average particular size range 20 to 150 microns (e.g., particulates having an average diameter of between 25 microns and 125 microns being preferred) and having a composition that promotes sufficient adhesion of the particulates to the substrate surface while the adhesive is in its uncured state. Further, upon adhering to the substrate and also after fusing to form the film layer and cooling down to ambient temperature, the composition of the adhesive is such that the layer is substantially non-tacky and dry to the touch. The composition for the adhesive material must therefore be such that the adhesive can be formed in a powder format and that it can remain in a powdered format during transport, storage and deposition.

The adhesive composition may be such that, while uncured, more than 50%, 60%, 70%, 80% or even 90% by weight (as established by differential scanning calorimetry) of the adhesive having groups available for cross-linking remain uncured. This is necessary so that the adhesive can develop suitable long term durable adhesion to the substrates that it will ultimately bond together.

The formulations employed to produce the adhesive powders of the present invention will depend upon the use to which the adhesive film is to be put.

A preferred formulation comprises
i) an epoxy resin
ii) an elastomer/epoxy resin adduct
iii) a core shell material and
iv) a curing agent and latent preferably the formulation additionally contains a phenoxy resin.

It is important that the final layers obtained from the powdered adhesive of this invention are not brittle and also that they have fracture toughness which is the ability to resist propagation of a flaw once one exists within the film. We have found that the use of a phenoxy resin improves the flexibility of the film and reduces the brittleness compared to films based solely upon epoxy resins. We have also found that the use of the elastomer epoxy adduct and the core/shell material provide fracture toughness as well as contributing to the flexibility of the layers obtained from the powdered adhesive.

We prefer to use a formulation that contains at least 15 wt % of a phenoxy resin, preferably from 15 to 40 wt % of a phenoxy resin. We prefer that the formulation contain at least 5 wt % of an elastomer epoxy resin adduct preferably from 5 to 40 wt %. Additionally the preferred formulation contains at least 5 wt % of a core shell polymer, preferably from 5 to 25 wt %. The percentages being of the entire formulation including other ingredients that may be present.

The phenoxy resins are high molecular weight materials which typically have a melting point around 150° C. or higher. As one important use of the powders of this invention is in the production of adhesive bonds by the curing of the layers obtained from the powders at temperatures experienced in the automobile e-coat process, it is preferred to formulate the formulation from which the powder is made at temperatures below the melting point of the phenoxy resin. Accordingly it is preferred that the phenoxy resin be provided to the formulating activity as a solution. We have found that a liquid epoxy resin is a particularly good solvent for the phenoxy resin.

Preferred phenoxy resins are high molecular weight thermoplastic condensation products of bisphenol A and epichlorohydrin and their derivatives. Typically the phenoxy resins that may be employed are of the formula

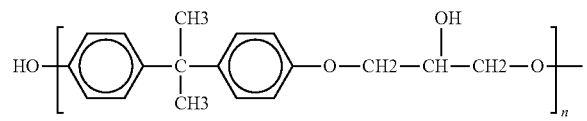

where n is typically from 30 to 100 preferably from 50 to 90. Modified phenoxy resins may also be used. Examples of phenoxy resins that may be used are the products marketed by Inchem Corp. Examples of suitable materials are the PKHB, PKHC, PKHH, PKHJ, PKHP-pellets and powder. Alternatively phenoxy/polyester hybrids and epoxy/phenoxy hybrids may be used. In order to enhance the production of the structural adhesive the phenoxy resin may be supplied to the other components as a solution. While any solvent may be used it is particularly preferred to use a liquid epoxy resin as the solvent as this can also contribute to the adhesive properties upon activation.

Typical other ingredients which may be used in the formulation include epoxy resins, hardeners (curing agents) for the epoxy resins, tougheners for the epoxy resin system and flexibilizers.

The adhesive formulations to which this invention applies include one or more curing agents and/or curing agent accelerators. Amounts of curing agents and curing agent accelerators may vary within the adhesive formulations depending upon the type of cure required and cross link density desired and the desired structural properties of cured adhesive. Exemplary ranges for the curing agents or curing agent accelerators present range from about 0.001% by weight to about 7% by weight. The curing agents assist the adhesive in curing by crosslinking of the polymers, epoxy resins or both. The curing agents may also assist in thermosetting the adhesive. Useful classes of curing agents are materials selected from aliphatic or aromatic amines or their respective adducts, amidoamines, polyamides, cycloaliphatic amines, anhydrides, polycarboxylic polyesters, isocyanates, phenol-based resins (e.g., phenol or cresol novolac resins, copolymers such as those of phenol terpene, polyvinyl phenol, or bisphenol-A formaldehyde copolymers, bishydroxyphenyl alkanes or the like), or mixtures thereof. The curing agents may include modified and unmodified polyamines or polyamides such as triethylenetetramine, diethylenetriamine tetraethylenepentamine, cyanoguanidine, dicyandiamides and the like. An accelerator for the curing agents (e.g., a modified or unmodified urea such as methylene diphenyl bis urea, an imidazole or a combination thereof) may also be provided for preparing the precursor layer. The curing agent should be activated at a temperature at which the formulation will flow and is preferably activated at temperatures above 110° C. most preferably at a temperature in the range of 150° C. to 220° C. such as the temperatures experienced in the automotive anticorrosion coat (known as e-coat) bake oven.

In a preferred embodiment at least two cross linking agents are included one that is activated at the temperature at which the deposited powder is fused to provide a layer of uncured adhesive on the substrate and this cross linking can control the viscosity of the molten powder so that the particles coalesce into a film and do not sag. The second cross linking agent being activated at a higher temperature to cross link the adhesive and create the final adhesive bond A preferred method of deposition of the powdered adhesive is electrostatic spraying and electromagnetic brush coating techniques can be employed to deposit relatively thin layers of a relatively strong adhesive onto components of an assembly. The adhesive (i.e., the adhesive in its uncured state) is such that it forms a thin film that is generally tack free and dry to the touch, thereby facilitating handling of subassemblies, as the assemblies are built.

In electrostatic spraying, particulates of coating materials can be transferred to an electrically active substrate (e.g., one that is electrostatically charged) by using one or more magnetic brushes. The particulates of adhesive are mixed with carrier particles that may have an attractive force. For example, the particulates of adhesive may become electrostatically charged or otherwise made to attract to and adhere to the carrier particles. The resulting carrier/adhesive particulate agglomerates are transferred to one or more brush rolls, desirably being magnetized so that the magnetized carrier particles together with the adhesive particulates adhering thereto effectively attach to the roll. A suitable electric charge may be applied to the system (e.g., to the brush apparatus and/or to an apparatus that supports the substrate) to cause the coating material particulates to detach from the magnetized carrier particles and transfer to the substrate (e.g., while the substrate is grounded). The carrier particles, in turn, remain with the roll for reclamation and re-use with other adhesive particulates.

The powdered adhesive formulation has an average particle size of at least about 20 microns and less than about 150 microns preferably having a diameter of at least about 25 microns and less than about 125 microns. The powdered adhesive may be obtained by grinding pellets of the adhesive formulation until they will pass through an appropriate sized mesh and it is here that we have found that if the adhesive formulation is maintained at a temperature below −10° C. during powder formation the tendency of the particles to agglomerate is considerably reduced. The deposited layer comprises a material that can undergo a physical transformation to form a film layer (e.g. a substantially solid precursor film layer) that bonds to the substrate upon which the powder was initially deposited. As such, the adhesive particulates may fuse together to form the film layer at a temperature below the temperature at which the ultimate adhesive properties are activated. The layer film may subsequently be activated to provide a cross-linked reaction product that bonds the substrate upon which the adhesive powder was initially deposited to an adjacent substrate.

In order to form a desirable adhesive that exists first in powder form, can then fuse to form a film layer, and later be activated to cure, the adhesive preferably includes an epoxy based material. The epoxy may be any dimeric, oligomeric or polymeric epoxy materials containing at least one epoxy functional group. Moreover, the term epoxy can be used to denote one epoxy or a combination of multiple epoxies. The polymer-based materials may be epoxy-containing materials having one or more oxirane rings polymerizable by a ring opening reaction. The powdered adhesive may include up to about 80% or more of an epoxy preferably between about 2% and 70% by weight epoxy, between about 4% and 30% by weight epoxy, or even between about 7% and 18% by weight epoxy. The adhesive may be substantially free of an epoxy material (other than any epoxy supplied in the form of an epoxy/elastomer adduct). The epoxy may be aliphatic, cycloaliphatic, aromatic or the like. The epoxy may be supplied as a solid (e.g., as pellets, chunks, pieces or the like) or a liquid. The epoxy may include an ethylene copolymer or terpolymer that may possess an alpha-olefin. The epoxy may include a phenolic resin, which may be a novolac type (e.g., an epoxy phenol novolac, an epoxy cresol novolac, combinations thereof, or the like) or other type resin. Other preferred epoxy containing material includes a bisphenol-A epichlorohydrin ether polymer, or a bisphenol-A epoxy resin which may be modified with butadiene or another polymeric additive. Moreover, various mixtures of several different epoxies may be employed as well. Examples of suitable epoxies are sold under the trade name DER® (e.g., DER 331, DER 661, DER 662), commercially available from the Dow Chemical Company, Midland, Mich.

The epoxy may be combined with a thermoplastic component, which may include styrenics, acrylonitriles, acrylates, acetates, polyamides, polyethylenes, phenoxy resins or the like. The thermoplastic component may be present in an amount of at least about 5% by weight of the precursor layer. The thermoplastic component may be present in an amount of from 20% to 60% by weight of the adhesive formulation.

While it is contemplated that various polymer/elastomer adducts may be employed in the adhesive formulation used in the present invention, one preferred adduct is an epoxy/elastomer adduct. The epoxy/elastomer hybrid or adduct may be included in an amount of from 5% to about 80% by weight of formulation typically 10% to 60% more preferably is about 10% to 30% by weight of the formulation. The elastomer-containing adduct may be a combination of two or more particular adducts and the adducts may be solid adducts or liquid adducts at a temperature of 23° C. or may also be combinations thereof. The adduct is preferably one or more adducts that are solid at a temperature of 23° C.

The adduct itself generally includes about 1:8 to 3:1 parts of epoxy or other polymer to elastomer, and more preferably about 1:5 to 1:6 parts of epoxy to elastomer. More typically, the adduct includes at least about 5%, more typically at least about 12% and even more typically at least about 18% elastomer and also typically includes not greater than about 50%, even more typically no greater than about 40% and still more typically no greater than about 35% elastomer, although higher or lower percentages are possible. The elastomer compound may be a thermosetting elastomer. Exemplary elastomers include, without limitation, natural rubber, styrene-butadiene rubber, polyisoprene, polyisobutylene, polybutadiene, isoprene-butadiene copolymer, neoprene, nitrile rubber (e.g., a butyl nitrile, such as carboxy-terminated butyl nitrile), butyl rubber, polysulfide elastomer, acrylic elastomer, acrylonitrile elastomers, silicone rubber, polysiloxanes, polyester rubber, diisocyanate-linked condensation elastomer, EPDM (ethylene-propylene diene rubbers), chlorosulphonated polyethylene, fluorinated hydrocarbons and the like. An example of a preferred epoxy/elastomer adduct is sold under the trade name HYPDX commercially available from CVC Chemical. Examples of additional or alternative epoxy/elastomer or other adducts suitable for use in the present invention are disclosed in U.S. Patent Publication 2004/0204551.

The elastomer-containing adduct, when added to the adhesive material, may modify structural properties of the adhesive formulation such as strength, toughness, stiffness, flexural modulus, or the like.

The adhesive formulation may also include one or more additional polymer and/or copolymer materials, such as thermoplastics, elastomers, plastomers, combinations thereof or the like. Polymers that might be appropriately incorporated into the adhesive include without limitation, polyolefin (e.g., polyethylene, polypropylene) polystyrene, polyacrylate, poly(ethylene oxide), poly(ethyleneimine), polyester, polyurethane, polysiloxane, polyether, polyphosphazine, polyamide, polyimide, polyisobutylene, polyacrylonitrile, poly(vinyl chloride), poly(methyl methacrylate), poly(vinyl acetate), poly(vinylidene chloride), polytetrafluoroethylene, polyisoprene, polyacrylamide, polyacrylic acid, or polymethacrylate.

The adhesive formulation may include at least one impact modifier. Various impact modifiers may be employed in the practice of the present invention and often include one or more elastomers. The impact modifier may be at least 4%, at least 7%, at least 10%, at least 13% and even still more typically at least 16% by weight of the adhesive formulation. The impact modifier may be less than 90%, less than 40% or even less than about 30% by weight of the adhesive formulation.

The impact modifier may include at least one core/shell impact modifier. The impact modifier may compromise at least 60%, at least 80% or even at least 95% core/shell impact modifier. As used herein, the term core/shell impact modifier denotes an impact modifier wherein a substantial portion (e.g., greater than about 30%, 50%, 70% or more by weight) thereof is comprised of a first polymeric material (i.e., the first or core material) that is substantially entirely encapsulated by a second polymeric material (i.e., the second or shell material). The first and second polymeric materials, as used herein, can be comprised of one, two, three or more polymers that are combined and/or reacted together (e.g., sequentially polymerized) or may be part of separate or same core/shell systems.

The first and second polymeric materials of the core/shell impact modifier can include elastomers, polymers, thermoplastics, copolymers, other components, combinations thereof or the like. The first polymeric material, the second polymeric material or both of the core/shell impact modifier may include or may be substantially entirely composed of (e.g., at least 70%, 80%, 90% or more by weight) one or more thermoplastics. Exemplary thermoplastics include, without limitation, styrenics, acrylonitriles, acrylates, acetates, polyamides, polyethylenes or the like.

Examples of useful core-shell graft copolymers are those where hard containing compounds, such as styrene, acrylonitrile or methyl methacrylate, are grafted onto a core made from polymers of soft or elastomeric containing compounds such as butadiene or butyl acrylate. The core polymer may also include other copolymerizable containing compounds, such as styrene, vinyl acetate, methyl methacrylate, butadiene, isoprene, or the like. The core polymer material may also include a cross linking monomer having two or more nonconjugated double bonds of approximately equal reactivity such as ethylene glycol diacrylate, butylene glycol dimethacrylate, and the like. The core polymer material may also include a graft linking monomer having two or more nonconjugated double bonds of unequal reactivity such as, for example, diallyl maleate and allyl methacrylate. The shell portion may be polymerized from methyl methacrylate and optionally other alkyl methacrylates, such as ethyl, butyl, or mixtures thereof methacrylates. Additional core-shell graft copolymers useful in embodiments of the present invention are described in U.S. Pat. Nos. 3,984,497; 4,096, 202; 4,034,013; 3,944,631; 4,306,040; 4,495,324; 4,304, 709; 4,536,436; and 7,892,396, the entireties of which are herein incorporated by reference herein. Examples of suitable core-shell graft copolymers include, but are not limited to, "MBS" (methacrylate-butadiene-styrene) polymers, which are made by polymerizing methyl methacrylate in the presence of polybutadiene or a polybutadiene copolymer rubber. The MBS graft copolymer resin generally has a styrene butadiene rubber core and a shell of acrylic polymer or copolymer. Examples of other useful core-shell graft copolymer resins include, ABS (acrylonitrile-butadiene-styrene), MABS (methacrylate-acrylonitrile-butadiene-styrene), ASA (acrylate-styrene-acrylonitrile), all acrylics, SA EPDM (styrene-acrylonitrile grafted onto elastomeric backbones of ethylene-propylene diene monomer), MAS (methacrylic-acrylic rubber styrene), and the like and mixtures thereof.

The adhesive formulation may also include one or more fillers, including but not limited to particulated materials (e.g., powder), beads, microspheres, or the like. The precursor layer may also be substantially free of any filler material. Fillers can be useful to reduce any blocking tendency of the uncured adhesive powder, reduce cost, and reduce the coefficient of thermal expansion of the cured material. The precursor layer may include a filler that comprises less than 25% by weight of the precursor material. Ideally, the filler may comprise less than about 2.5% by weight of the precursor layer. Any filler present may include a material that is generally non-reactive with the other components present in the precursor layer. Certain fillers can also reduce the tendency of the particles to agglomerate as well as reducing the blocking tendency.

Examples of suitable fillers include silica, diatomaceous earth, glass, clay (e.g., including nanoclay), talc, pigments, colorants, glass beads or bubbles, glass, carbon or ceramic fibers, nylon aramid or polyamide fibers (e.g., Kevlar), antioxidants, and the like. Such fillers, particularly clays, can assist the activatable material in leveling itself during flow of the material. The clays that may be used as fillers may include clays from the kaolinite, illite, chloritem, smecitite or sepiolite groups, which may be calcined. Examples of suitable fillers include, without limitation, talc, vermiculite, pyrophyllite, sauconite, saponite, nontronite, montmorillonite or mixtures thereof. The clays may also include minor amounts of other ingredients such as carbonates, feldspars, micas and quartz. The fillers may also include ammonium chlorides such as dimethyl ammonium chloride and dimethyl benzyl ammonium chloride. Titanium dioxide might also be employed.

In one embodiment it is preferred to include a thixotropic filler such as aramid fibre or certain clays in the adhesive formulation. The inclusion of such a thixotropic filler can reduce the tendency of the adhesive formulation to flow and sag when it is a fluid state such as when the powder particles coalesces to form a film after application or when it is heated to the activation temperature.

The adhesive formulation may be foamable and it may contain a heat activatable blowing agent for example one that decomposes to produce gas at temperatures experienced in the automotive anticorrosion coating bake oven. Typically temperatures in the range 140° C. to 220° C. The blowing agent may be selected to generate gases for foaming at around the activation temperature of the cross linking agent. Examples of suitable blowing agents are chemical blowing agents such as azodicarbonamides and hydrazides and physical blowing agents. It is preferred that the crosslinking agent will cure the adhesive during foam formation so that the molten formulation is sufficiently viscous to entrap the gas produced by the decomposition of the blowing agent.

The powdered adhesive of the present invention may be used with any substrate and may be used for the bonding together of a range of substrates. For example the adhesive may be used to bond together metal substrates such as in automobile manufacture. It may be used in the bonding of different substrates such as the bonding of metal to fibre reinforced composites. It may be used for the bonding of glass such as in windows and automobile windscreens. The powder may also be used to provide a curable fibrous matt in which the powder acts as a curable matrix within the matt, in which instance the powder may be sprayed onto the matt which is vibrated to distribute the powder particles to the intersties of the fibrous matt.

Cured adhesive layers formed from the powder of the present invention can exhibit relatively high impact resistance particularly for certain combinations and amounts of ingredients (e.g., combination of certain amounts of adduct, amounts of impact modifier or both) as disclosed herein, can exhibit desirable toughness and/or T-peel strengths. As an example, the adhesive material of the present invention has been found to exhibit, according to ASTM D 1876-01, T-peel strengths of at least about 2 N/mm, at least about 3.7 N/mm or even at least about 5.5 N/mm.

The lap shear strengths of the cured adhesive layer are determinable according to ASTM D1002-01. Lap shear strength of the adhesive at 73.4° F. may be greater than about 1000 psi, often greater than about 2000 psi, can be greater than 3000 psi and can even be greater than about 3500 psi. Lap shear strength of the adhesive material at −67° F. is often greater than about 1000 psi, often greater than about 2000 psi, can be greater than 2200 psi and can even be greater than about 3000 psi.

The present invention can be used to deposit powder of a heat activatable adhesive on larger surface areas than has hitherto been possible by extrusion deposition and by pumpable liquid adhesives. It has been found useful in the provision of substantially uniform films of thickness ranging from 50 to 500 μm on three dimensional structures including those of complex shape. The thickness and location of the adhesive film on the substrate can be varied by the use of masks. The adhesive may be applied without contact between the applicator and the surface. Additionally we have found that sufficient adhesion between the adhesive powder and an oily metal surface can be achieved so avoiding the need for cleaning the surface. We have also found that adhesive materials such as the products L-5236 and L-5810 as described in European Patent Application Publication 2569384 and obtainable from L & L Products Europe can be powdered and applied according to the present invention without any significant degradation of their adhesive properties particularly when an anticaking agent is included in the formulation.

We have found that the powdered adhesives of the present invention are easy to handle and apply. Their use can be directed and controlled to the areas where adhesion is required so producing very little if any scrap. We have also found that the powder can be readily coalesced to form a coherent layer in the substrate and the thickness of the layer is easy to control again making efficient use of material. Standard techniques for curing the adhesive adhesive such as automotive e-coat baking can be used so that in many instances there is no need for special curing ovens or the like.

The invention is illustrated by the following Example.

EXAMPLE

The materials available as pellets from L&L Products coded L5236 (foamable material) and L5810 (non foamable material) and of average particle size of 1.5 to 3 mm were pulverised into powder of average particle size about 0.3 mm.

The powder and the original pellets were each applied to three coupons of flat 0.7 mm and 2 mm thick galvanised steel.

The powder was applied by electrostatic spraying and the pellets were applied by extrusion.

Another steel sheet was superimposed on the adhesive and the sheets pressed together and held for 30 minutes at 165° C. The T peel strength of the bonds obtained was measured and found to be as follows.

| Substrate | 0.7 mm Steel Mpa | 2 mm Steel Mpa |
|---|---|---|
| 5236 Pellets | 10.5 | 14.8 |
| 5236 Powder | 10.1 | 13.6 |
| 5810 Pellets | 16.2 | 32 |
| 5236 Powder | 17.0 | 35 |

Showing that the adhesive properties were not significantly changed when using extruded pellets or sprayed powder on flat steel sheet.

The adhesives were then applied to the automobile component shown in FIG. 1 hereto. A uniform coating of adhesive was obtained by electrostatic spraying of the powdered adhesive whereas a uniform coating could not be obtained by extrusion of the pelletised adhesive.

The invention claimed is:

1. An adhesive comprising: a solvent free powder of average particle size in the range of 20 to 300 microns, in which the adhesive formulation contains a first cross-linking agent and a second cross-linking agent, a heat activatable curing agent, and a heat activatable blowing agent,
   wherein the adhesive is heat activatable at a heat activation temperature in the range of 140° C. to 220° C., is flowable at a temperature below the heat activation temperature, and is dry and non-tacky to the touch at ambient temperature, and
   wherein the first cross-linking agent is activated at a first temperature where the solvent free powder is fused to form a non-oriented fused layer of uncured adhesive film and the second cross-linking agent is activated at a second temperature higher than the first temperature to create a final adhesive bond between the non-oriented fused layer of uncured adhesive film and one or more substrates.

2. The adhesive according to claim 1, wherein the solvent free powder is of average particle size in the range of 20 to 150 microns.

3. The adhesive according to claim 1, wherein the adhesive formulation contains an anticaking agent.

4. The adhesive according to claim 3, wherein the anticaking agent is silica or calcium stearate.

5. The adhesive according to claim 3, wherein the adhesive contains from 0.1% to 4% by weight of the anticaking agent.

6. The adhesive according to claim 1, wherein the adhesive formulation contains a thixotropic filler.

7. The adhesive according to claim 1, wherein the adhesive formulation contains an epoxy resin.

8. The adhesive according to claim 1, further comprising:
   i. an epoxy resin;
   ii. an elastomer/epoxy resin adduct; and
   iii. a core shell material.

9. The adhesive according to claim 8, wherein the adhesive contains from 15% to 40% by weight of a phenoxy resin.

10. The adhesive according to claim 9, wherein the phenoxy resin is a thermoplastic condensation product of bisphenol A and epichlorohydrin and their derivatives.

11. The adhesive according to claim 8, wherein the adhesive contains from 5% to 40% by weight of the elastomer/epoxy resin adduct.

12. The adhesive according to claim 8, wherein the adhesive contains from 5% to 25% by weight of the core shell material.

13. The adhesive according to claim 8, wherein the adhesive contains from 0.001% to 7% by weight of the curing agent.

14. The adhesive according to claim 8, wherein the curing agent includes modified polyamines or polyamides, unmodified polyamines or polyamides, or both.

15. The adhesive according to claim 8, wherein the adhesive contains from 2% to 70% of the epoxy resin.

16. The adhesive according to claim 8, wherein the epoxy resin includes an ethylene copolymer or terpolymer that possesses an alpha-olefin.

17. The adhesive according to claim 8, wherein the epoxy resin includes a phenolic resin.

18. The adhesive according to claim 1, wherein the adhesive is prepared at a temperature below −10° C.

19. The adhesive according to claim 1, wherein the adhesive is free of an epoxy material other than any epoxy supplied in a form of an epoxy/elastomer adduct.

20. The adhesive according to claim 1, wherein the solvent free powder is configured to adhere to a first substrate, activated to form the non-oriented fused layer of uncured adhesive film on the first substrate, and then create the final adhesive bond between the first substrate and a second substrate.

* * * * *